(12) United States Patent
Haimerl et al.

(10) Patent No.: US 9,108,494 B2
(45) Date of Patent: Aug. 18, 2015

(54) CONVERTIBLE TOP WITH LINK ARRANGEMENTS FOR ADJUSTING A CONVERTIBLE TOP ELEMENT

(71) Applicant: Webasto-Edscha Cabrio GmbH, Stockdorf (DE)

(72) Inventors: Alexander Haimerl, Bogen (DE); Georg Kopp, Plattling (DE); Magnus Sviberg, Deggendorf (DE)

(73) Assignee: WEBASTO-EDSCHA CABRIO GMBH, Stockdorf (DE)

( * ) Notice: Subject to any disclaimer, the term of this patent is extended or adjusted under 35 U.S.C. 154(b) by 0 days.

(21) Appl. No.: 14/472,961

(22) Filed: Aug. 29, 2014

(65) Prior Publication Data

US 2015/0151619 A1 Jun. 4, 2015

Related U.S. Application Data

(63) Continuation-in-part of application No. 14/097,034, filed on Dec. 4, 2013.

(51) Int. Cl.
*B60J 7/00* (2006.01)
*B60J 7/12* (2006.01)

(52) U.S. Cl.
CPC ..................................... *B60J 7/1265* (2013.01)

(58) Field of Classification Search
CPC ....................................................... B60J 7/1265
See application file for complete search history.

(56) References Cited

U.S. PATENT DOCUMENTS

| | | | |
|---|---|---|---|
| 5,620,226 A * | 4/1997 | Sautter, Jr. | 296/107.08 |
| 5,667,269 A * | 9/1997 | Prenger et al. | 296/107.09 |
| 5,903,119 A * | 5/1999 | Laurain et al. | 318/265 |
| 5,998,948 A * | 12/1999 | Lange et al. | 318/280 |
| 6,311,650 B1 | 11/2001 | Lamm | |
| 6,435,606 B1 | 8/2002 | Miklosi et al. | |
| 2007/0152469 A1* | 7/2007 | Papendorf et al. | 296/108 |
| 2011/0227364 A1* | 9/2011 | Neubrand et al. | 296/108 |

FOREIGN PATENT DOCUMENTS

DE 19939724 C1 2/2001
EP 1060942 A2 12/2000

* cited by examiner

*Primary Examiner* — Lori L Lyjak
(74) *Attorney, Agent, or Firm* — Fitch, Even, Tabin & Flannery LLP

(57) ABSTRACT

A vehicle convertible top having a linkage arrangement on both sides with respect to a vertical longitudinal center plane of the convertible top, the link arrangement being pivotably mounted on a main bearing fixed to the vehicle and serving to adjust a convertible top element between a lifted operating position and a lowered storage position. The link arrangements can each have a lower four-joint arrangement having two base links pivotably mounted on the respective main bearing and an upper four-joint arrangement which has two adjusting links pivotably connected to the convertible top element, the base links and the adjusting links being hinged to a coupling link that forms part of the two four-joint arrangements, and one of the base links being connected to one of the adjusting links via a control link so that the upper four-joint arrangement is coupled with the lower four-joint arrangement in a positively controlled manner.

10 Claims, 8 Drawing Sheets

CONVERTIBLE TOP WITH LINK ARRANGEMENTS FOR ADJUSTING A CONVERTIBLE TOP ELEMENT

CROSS-REFERENCE TO RELATED APPLICATIONS

This application is a continuation-in-part of U.S. Non-Provisional patent application Ser. No. 14/097,034, filed on Dec. 4, 2013, and entitled "Vehicle Construction having Roll Bars and a Convertible Roof". The priority of the prior application is expressly claimed, and the disclosure of this prior application is hereby incorporated by reference in its entirety.

TECHNICAL FIELD

The disclosure relates to a convertible top of a cabriolet vehicle, and in particular to a convertible top having a linkage comprising a link arrangement on both sides with respect to a vertical longitudinal center plane of the convertible top, said link arrangement being pivotably mounted on a main bearing fixed to the vehicle and serving to adjust a convertible top element between a lifted operating position and a lowered storage position.

BACKGROUND

A convertible top of a cabriolet vehicle with a convertible top element designed as a convertible top cassette is known from document EP 1 060 924 A2, for example. Said convertible top comprises a convertible top linkage which comprises a link arrangement on both sides with respect to a vertical longitudinal center plane of the convertible top, said link arrangement being pivotably mounted on a respective main bearing fixed to the vehicle. The link arrangements are each hinged to the rear-side convertible top cassette, which is adjustable between a lifted operating position and a lowered storage position. In the lifted operating position, the convertible top cassette or roof cassette forms a rear-side corner area of the roof of the respective vehicle formed by the convertible top. In the lowered storage position, the convertible top cassette is accommodated by a rear-side storage space of the vehicle. The convertible top cassette delimits a folding top portion at the rear, which can be unfolded or extended up to a forward cowl of the vehicle so as to span a vehicle interior. When the convertible top cassette is lowered into the storage position, the folding top portion is accommodated by the convertible top cassette. Furthermore, a drive mechanism for the folding top portion is integrated in the convertible top cassette.

In the afore-described known convertible top, the convertible top cassette undergoes a displacement in the longitudinal direction of the convertible top or of the vehicle when being adjusted between the storage position and the operating position. In particular in cases where the respective vehicle has a roll cage and a superstructure located at the rear of the vehicle with a brake light, a spare tire or the like, an expansive displacement of the convertible top cassette during adjustment is not possible because of the constructed space.

SUMMARY

Convertible tops are described having a convertible top element which is mounted on a convertible top linkage and whose displacement in the longitudinal direction of the convertible top during adjustment between a lifted operating position and a lowered storage position can be kept small as compared to known convertible tops.

In particular, a convertible top of a cabriolet vehicle is proposed having a convertible top linkage which has a link arrangement on both sides with respect to a vertical longitudinal center plane of the convertible top, said link arrangement being pivotably mounted on a main bearing fixed to the vehicle and serving to adjust a convertible top element between a lifted operating position and a lowered storage position. The link arrangements each comprise a lower four-joint arrangement which has two base links that are pivotably mounted on the respective main bearing and an upper four-joint arrangement which has two adjusting links that are pivotably connected to the convertible top element. The base links and the adjusting links are hinged to a coupling link which forms part of the two four-joint arrangements. One of the base links is connected to one of the adjusting links via a control link so that the upper four-joint arrangement is coupled with the lower four-joint arrangement in a positively controlled manner. By using two mutually coupled four-joint arrangements, the displacement of the convertible top element during its adjustment in the longitudinal direction of the convertible top can be kept small.

The convertible top element is in particular a rear-side convertible top cassette of a folding top, which forms a rear-side corner area of the respective vehicle roof and may serve to adjust and accommodate a folding top portion.

According to one approach, a convertible top is disclosed that is advantageous with regard to a collision-free adjustment path of the convertible top element, the upper four-joint arrangement is pivoted in the opposite direction with respect to the lower four-joint arrangement when the link arrangements are actuated. In this configuration, the two link arrangements can be folded against each other when the convertible top element is lowered, whereas the four-joint arrangements have a stretched position with respect to each other in the lifted operating position of the convertible top element.

In a special embodiment of the convertible top according to one approach, the adjusting links are pivoted rearward and downward when the convertible top element is pivoted from the operating position into the storage position. It is also conceivable to pivot the adjusting links forward and downward when lowering the convertible top element.

The coupling link, which forms a common base of the two four-joint arrangements, preferably has three fulcrums. One of the adjusting links and one of the base links are both hinged to one of the fulcrums. The other base link and the other adjusting link are hinged to the other two fulcrums. Preferably, the coupling link is a triangular link, i.e. the three fulcrums together form a triangle.

The lower four-joint arrangement is usually the driven four-joint arrangement. For example, a drive wheel drives the lower four-joint arrangement. The drive-wheel may in turn be driven by an electric motor. Alternatively, it is also conceivable, however, that the lower four-joint arrangement is driven by means of a hydraulic cylinder.

For connecting the lower four-joint arrangement to the drive wheel, the drive wheel is connected to one of the base links via a drive link in a special embodiment of the convertible top according to one approach.

Preferably, a stop element is provided that defines a first end position and a second end position of the drive wheel so that the operating position and the storage position of the convertible top element can be clearly defined.

Furthermore, in a special embodiment of the convertible top according to one approach, the convertible top cassette, when pivoting into the storage position, accommodates a folding top portion which can be adjusted in the operating position between a closed position spanning a vehicle interior and a stowage position opening the vehicle interior toward the top, in which the folding top portion is accommodated by the convertible top cassette.

Other advantages and advantageous embodiments of the subject-matter of the present embodiments can be taken from the description, the drawing and the patent claims.

DETAILED DESCRIPTION OF A PREFERRED EMBODIMENT

Figure 1:
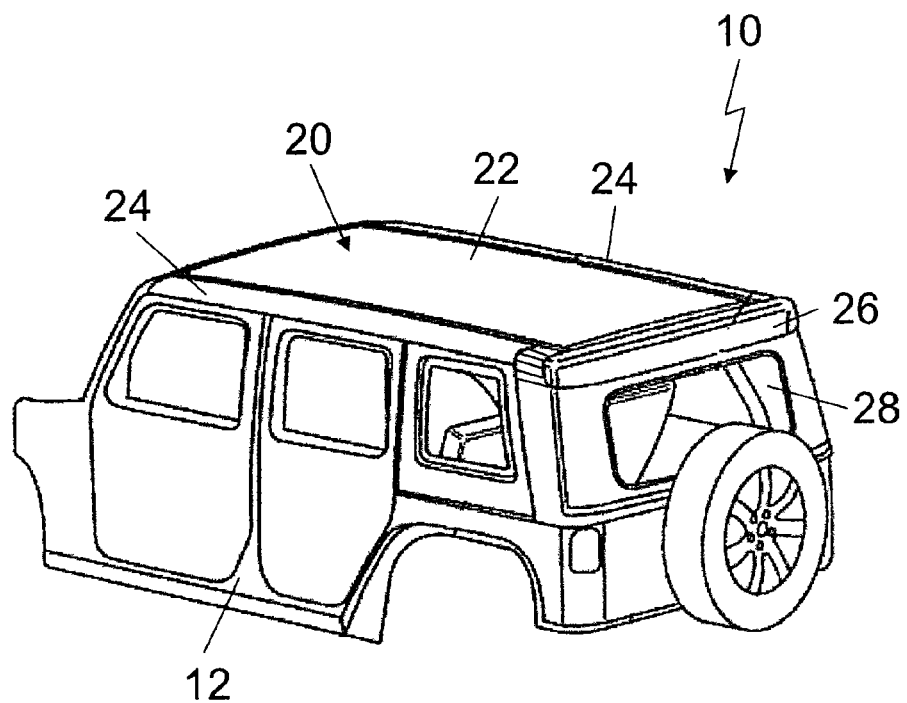
FIG. 1 shows a vehicle superstructure with an adjustable convertible top in its closed position.

In the drawings, a vehicle superstructure 10 is illustrated which is part of a passenger car embodied as an all-terrain vehicle. The vehicle superstructure 10 comprises a body 12 which is provided with a roll cage 14. The roll cage 14 comprises a roll bar 16 on both sides with respect to a vertical longitudinal center plane of the vehicle, said roll bar 16 extending in the longitudinal direction of the vehicle and being supported on the vehicle body 12 in the rear area. The roll bars 16 arranged on both sides are connected to each other via roll braces 18 extending in the vertical direction of the vehicle and together with them they form the roll cage 14.

The vehicle superstructure 10 is provided with an adjustable convertible top 20 which is formed as a folding top in the broadest sense and has a folding top portion 22 which forms the actual vehicle roof in its closed position and which is guided between two lateral longitudinal roof beams 24 which delimit the vehicle roof at the sides and consequently each form a lateral longitudinal roof support. At the rear, the folding top portion 22 is connected to a convertible top cassette 26 which represents a convertible top element, accommodates an adjusting mechanism for the folding top portion 22 and forms a rear-side corner area of the vehicle roof in the closed position. The convertible top 20 further comprises a backlite 28, which is also embodied in an adjustable manner, in an area located beneath the convertible top cassette 26 in the closed position.

Figure 2:
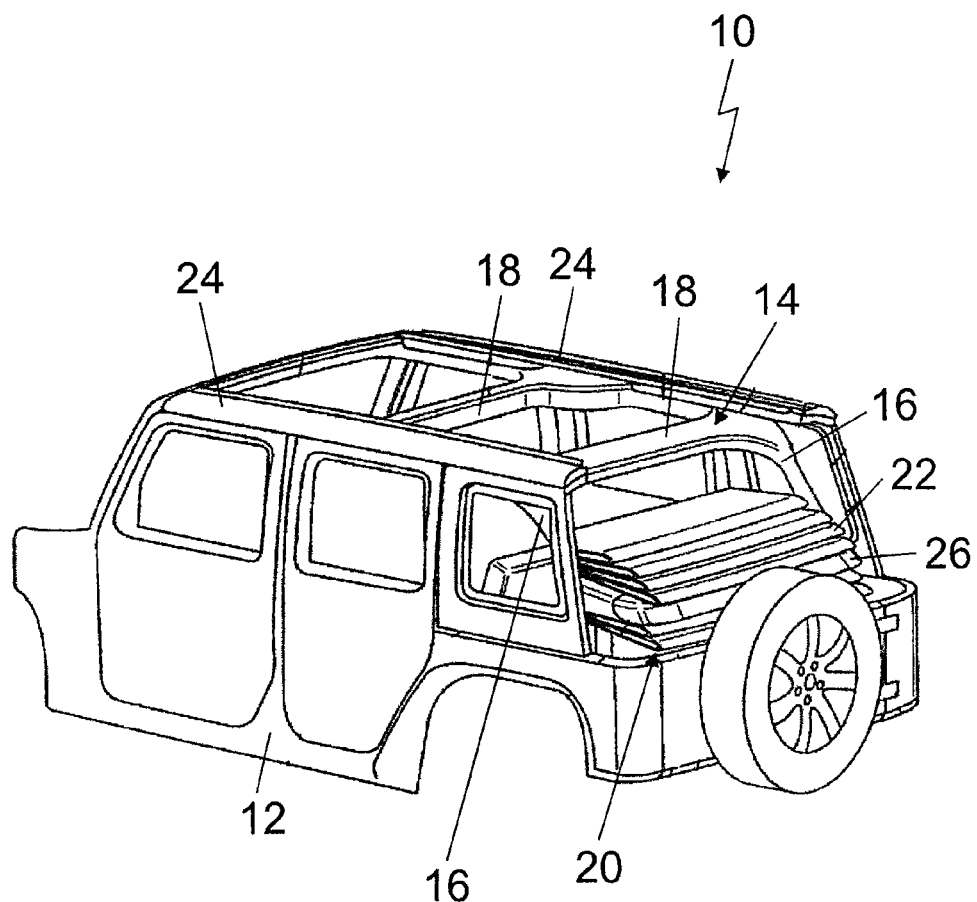
FIG. 2 shows the vehicle superstructure according to FIG. 1 with the adjustable convertible top in its opening position.

To bring the convertible top 20 from the closed position illustrated in FIG. 1 into the storage position illustrated in FIG. 2, the folding top portion 22 is first moved in the rearward direction into the convertible top cassette 26 so that the folding top portion 22 takes up a stowage position and the convertible top cassette 26 can be adjusted together with the folding top portion 22 from its lifted operating position into its lowered storage position, in which the unit formed by the folding top portion 22 and the convertible top cassette 26 is accommodated in a rear-side convertible top storage space. To be able to lower the convertible top cassette 26, the backlite 28 is folded forward.

For adjusting the convertible top cassette 26, the convertible top 20 comprises a convertible top linkage 30 which is formed mirror-symmetrically with respect to a vertical longitudinal center plane of the convertible top and comprises a link arrangement 32 on both sides which is pivotably mounted on a respective main bearing 34 fixed to the vehicle, said main bearing being rigidly connected to the respective roll bar 16, which extends in the longitudinal direction of the vehicle.

The link arrangements 32 arranged on both sides each comprise a lower four-joint arrangement 36 which is formed of two base links 38 and 40 that are ach pivotably mounted on the main bearing 34 via a fulcrum 42 and 44, respectively. In their end portions facing the convertible top cassette 26, the base links 38 and 40 are each hinged via a fulcrum 46 and 48, respectively, to a coupling link 50 formed as a triangular link.

The coupling link 50 forms a base for an upper four-joint arrangement 52 and does so in such a manner that two adjusting links 54 and 56 are each hinged with one end to the coupling link 50. In this context, the adjusting link 54 forms a fulcrum 58 with the coupling link 50, whereas the adjusting link 56 shares the fulcrum 48 on the coupling link 50 with the base link 40. On their ends facing away from the coupling link 50, the adjusting links 54 and 56 are each connected to the convertible top cassette 26 via a fulcrum 60 and 62, respectively.

To produce a positively controlled coupling between the lower four-joint arrangement 36 and the upper four-joint arrangement 52, a control link 66 is hinged via a fulcrum 64 to the end of the base link 38 facing away from the fulcrum 42, said control link 66 being hinged in turn to the adjusting link 56 of the upper four-joint arrangement 52 via a fulcrum 68 facing away from the base link 38.

For drive, the link arrangement 32 has an electric motor 70, which drives a drive wheel 72 to which a coupling piece 74 with a triangular outline is rigidly connected. A drive link 78 is hinged to the coupling piece 74 via a fulcrum 76, said drive link 78 being connected to an appendix of the base link 40 of the lower four-joint arrangement 36 via a fulcrum 80 that faces away from the coupling piece 74.

To be able to determine the two end positions of the drive wheel 72, a stop 82 is formed on the main bearing 34, on which the drive wheel 72 is also rotatably mounted, said stop 82 interacting with the coupling piece 74 in that, in the first end position, the latter abuts against the stop 82 with a lateral surface extending approximately radially with respect to the rotation axis of the drive wheel 72 and, in the second end position, it abuts against the stop 82 with a second lateral surface extending approximately in the radial direction. Alternatively, two stops may be provided one for each end position.

Figure 3:
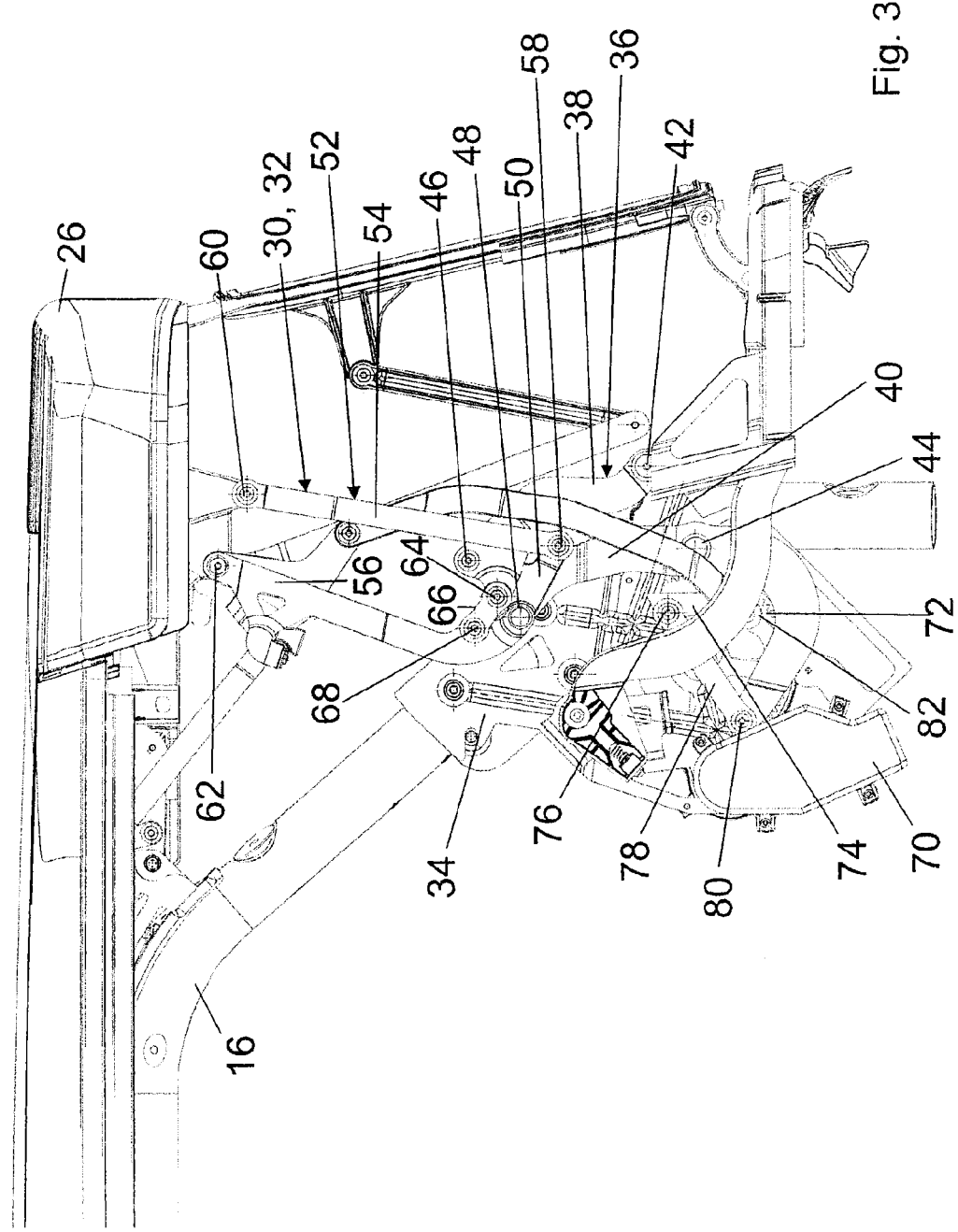
FIG. 3 shows an enlarged lateral view of the convertible top in its rear area without illustration of a convertible top cover and in the closed position.
Figure 4:
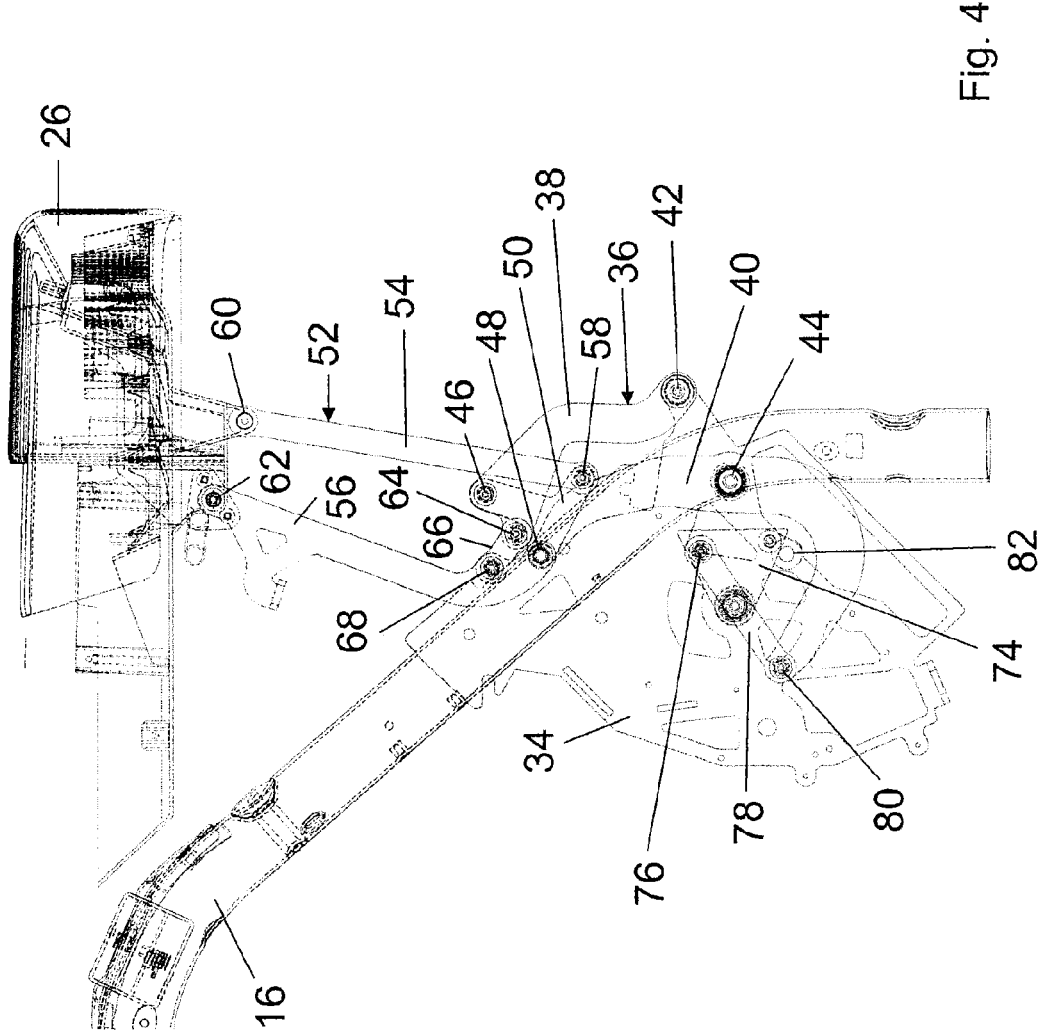
FIG. 4 shows the convertible top in the closed position in an illustration corresponding to FIG. 3, but without side beams and rear window.
Figure 5:
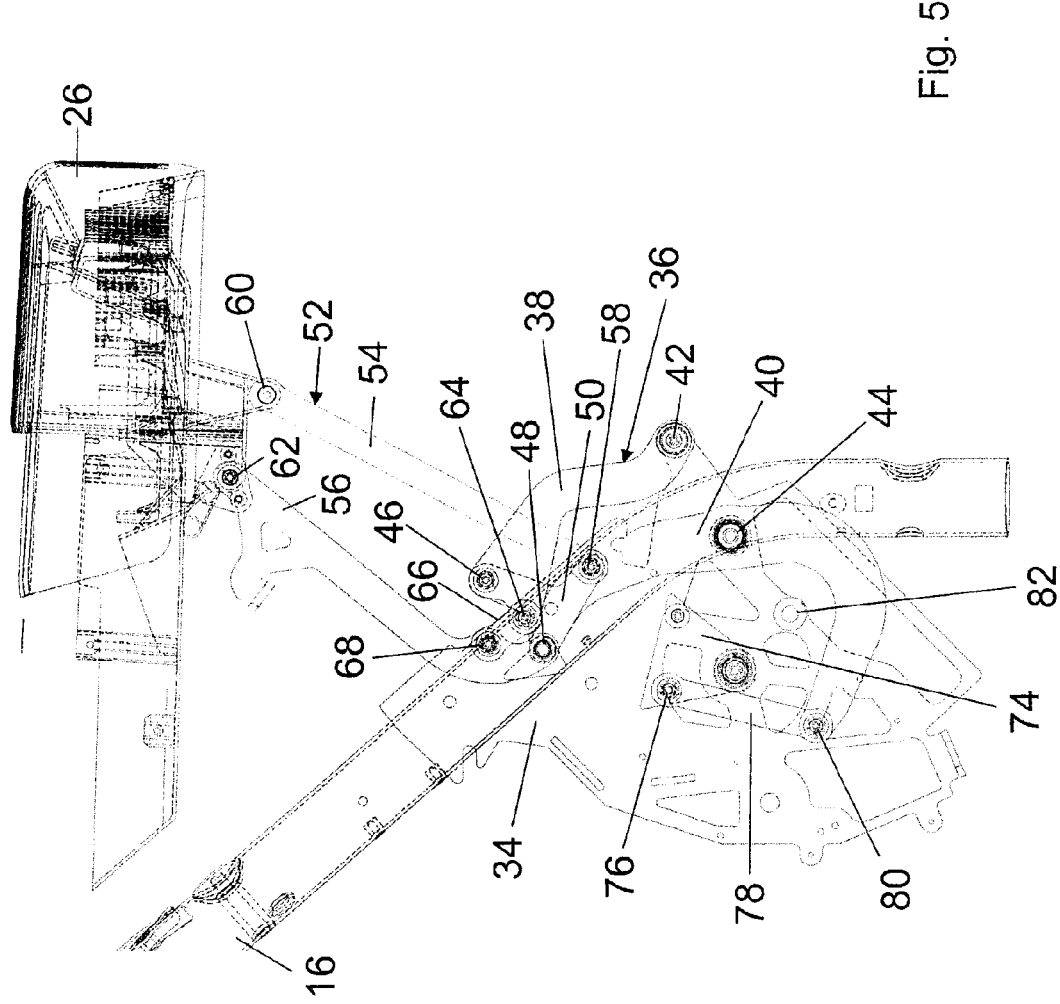
FIG. 5 shows the convertible top in a first intermediate position.
Figure 6:
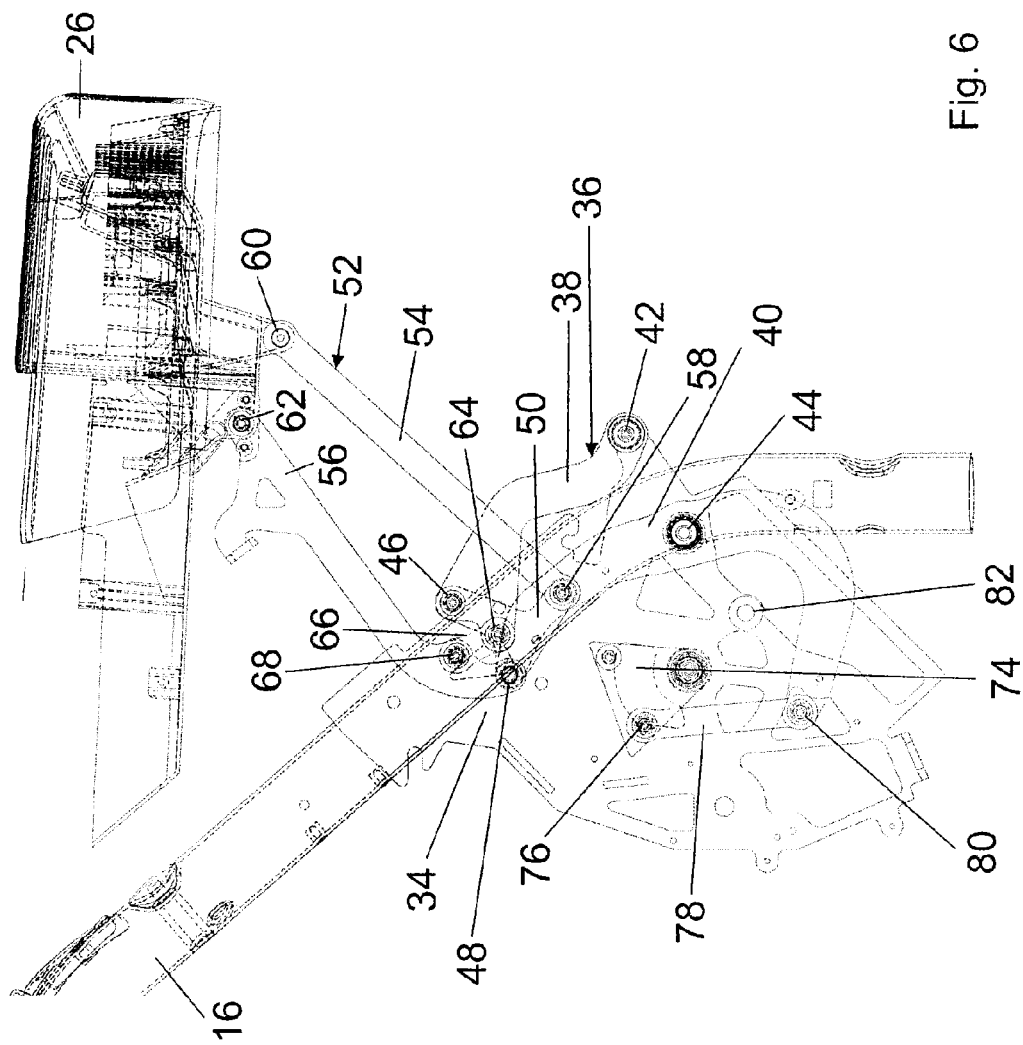
FIG. 6 shows the convertible top in a second intermediate position.
Figure 7:
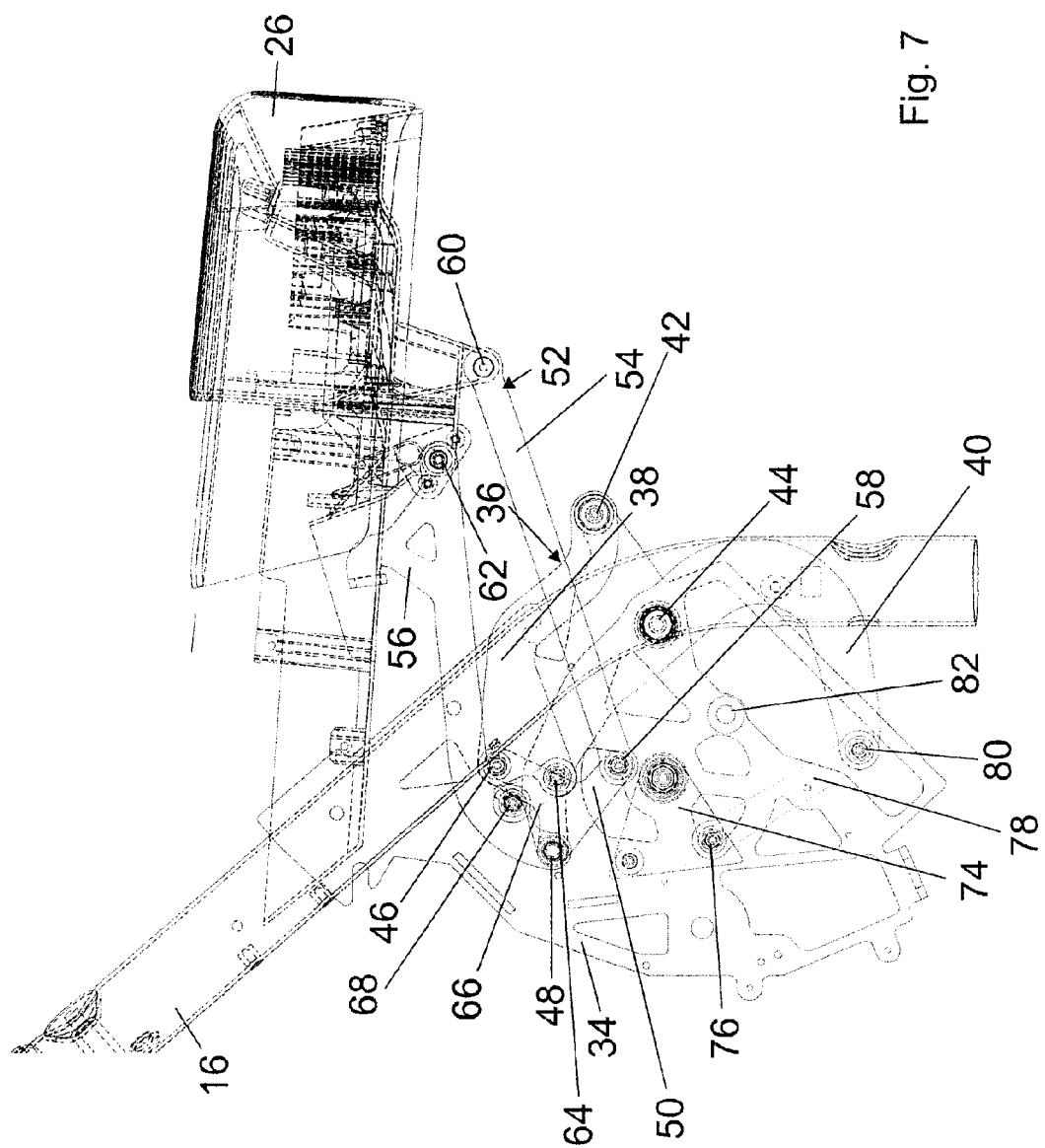
FIG. 7 shows the convertible top in a third intermediate position.
Figure 8:
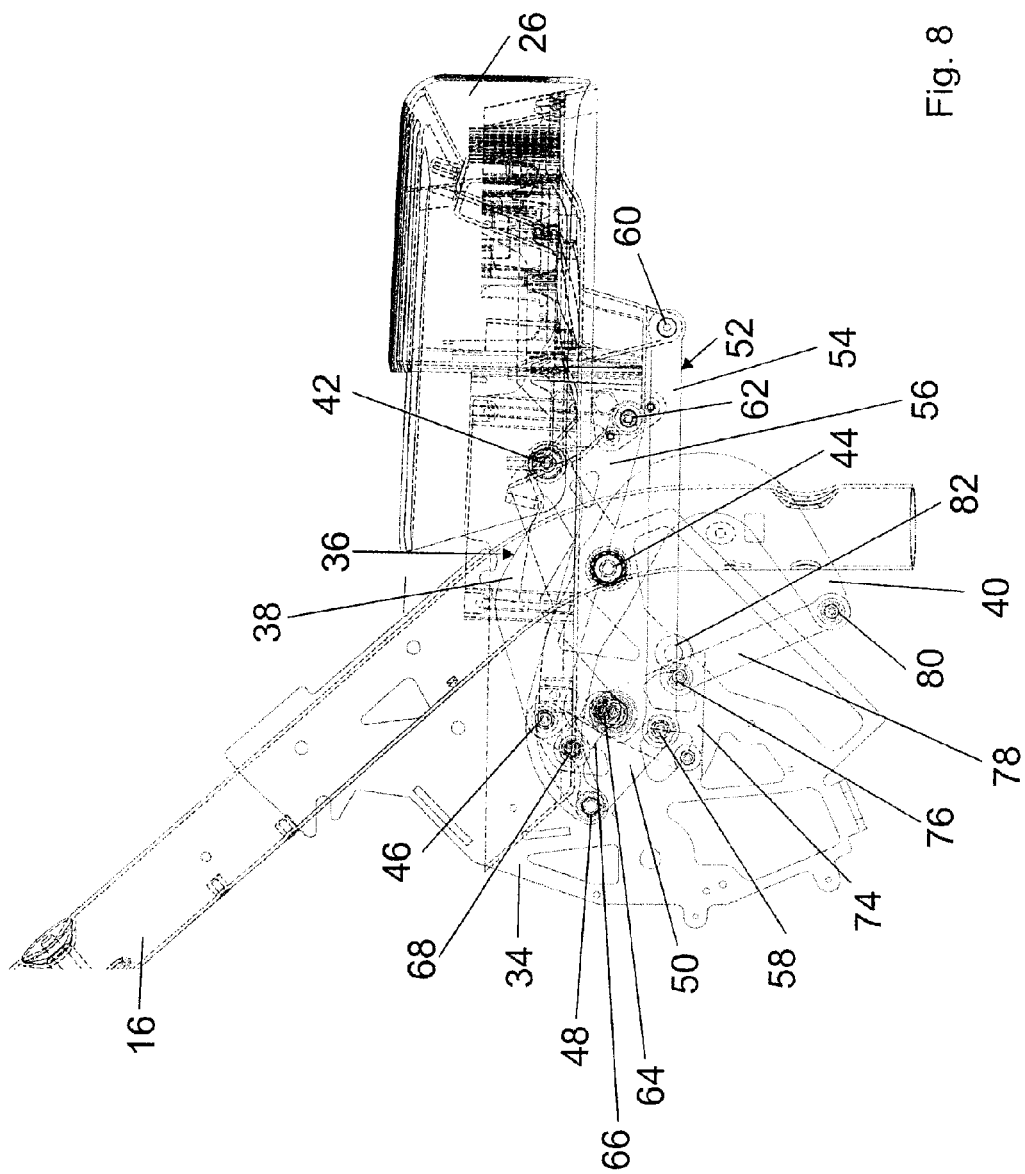
FIG. 8 shows the convertible top in a storage position.

When adjusting the convertible top cassette 26 from the operating position illustrated in FIG. 3, which is associated with the closed position of the convertible top 20, into the storage position illustrated in FIG. 8, the drive wheel 72, in the orientation illustrated in FIGS. 3 to 8, will be rotated out of one end position in the clockwise sense so that the lower four-joint 36 and its base link 38 and 40 are pivoted forward and downward, i.e. in the counter-clockwise sense. In this way, a torque is introduced into the upper four-joint arrangement 52 via the coupling link 50 and the control link 66, through which the two adjusting links 54 and 56 are pivoted rearward and downward. By means of this positively controlled, coupled and contrary pivot motion of the two four-joint arrangements 36 and 52, the convertible top cassette 26 can be brought from the operating position illustrated in FIG. 3 into the storage position illustrated in FIG. 8 largely without offset in the longitudinal direction of the vehicle or of the convertible top. In the storage position, the coupling piece 74 abuts against the stop 82.

The invention claimed is:

1. A convertible top of a vehicle, comprising:
a convertible top linkage which comprises a link arrangement on both sides with respect to a vertical longitudinal center plane of the convertible top, said link arrangement being pivotably mounted on a main bearing fixed to the vehicle and serving to adjust a convertible top element between a lifted operating position and a lowered storage position, the link arrangements each comprising a lower four-joint arrangement which has two base links that are pivotably mounted on the respective main bearing and an upper four-joint arrangement which has two adjusting links that are pivotably connected to the convertible top element, the base links and the adjusting links being hinged to a coupling link that forms part of the two four-joint arrangements, and one of the base links being connected to one of the adjusting links via a control link so that the upper four-joint arrangement is coupled with the lower four-joint arrangement in a positively controlled manner.

2. The convertible top according to claim 1, wherein the upper four-joint arrangement is pivoted in the opposite direction with respect to the lower four-joint arrangement when the link arrangements are actuated.

3. The convertible top according to claim 1, wherein the adjusting links are pivoted rearward and downward when the convertible top element is pivoted from the operating position into the storage position.

4. The convertible top according to claim 1, wherein three fulcrums are formed on the coupling link and both an adjusting link and a base link are hinged to one of the fulcrums.

5. The convertible top according to claim 1, wherein the coupling link is a triangular link.

6. The convertible top according to claim 1, wherein a drive wheel drives the lower four-joint arrangement.

7. The convertible top according to claim 6, wherein the drive wheel is connected to one of the base links via a drive link.

8. The convertible top according to claim 6, wherein a stop element defines a first end position and a second end position of the drive wheel.

9. The convertible top according to claim 1, wherein the convertible top element is a rear-side convertible top cassette.

10. The convertible top according to claim 9, wherein the convertible top cassette accommodates a folding top portion of the convertible top when pivoting into the storage position, said folding top portion being adjustable in the operating position between a closed position spanning a vehicle interior and a stowage position opening the vehicle interior toward the top, in which the folding top portion is accommodated by the roof cassette.

\* \* \* \* \*